United States Patent
Gratz (10) Patent No.: US 9,688,168 B2
(45) Date of Patent: Jun. 27, 2017

(54) INTEGRATED SEAT AND BACKREST

(71) Applicant: S2 Yachts, Inc., Holland, MI (US)

(72) Inventor: Christopher M. Gratz, Port St. Lucie, FL (US)

(73) Assignee: S2 Yachts, Inc., Holland, MI (US)

( * ) Notice: Subject to any disclaimer, the term of this patent is extended or adjusted under 35 U.S.C. 154(b) by 57 days.

(21) Appl. No.: 14/748,578

(22) Filed: Jun. 24, 2015

(65) Prior Publication Data
US 2015/0375644 A1    Dec. 31, 2015

Related U.S. Application Data

(60) Provisional application No. 62/016,844, filed on Jun. 25, 2014.

(51) Int. Cl.
*B60N 2/30* (2006.01)
*B64D 11/06* (2006.01)
*B63B 29/04* (2006.01)

(52) U.S. Cl.
CPC ........... *B60N 2/309* (2013.01); *B60N 2/3027* (2013.01); *B60N 2/3065* (2013.01); *B60N 2/3093* (2013.01); *B63B 2029/043* (2013.01)

(58) Field of Classification Search
CPC .. B60N 2/3804; B60N 2/3097; B60N 2/3047; B63B 2029/043; B64D 11/0691; B64D 11/0698
See application file for complete search history.

(56) References Cited

U.S. PATENT DOCUMENTS

| | | | | |
|---|---|---|---|---|
| 1,355,005 A | * | 10/1920 | Schechter | B61D 33/0085 297/14 |
| 1,412,367 A | * | 4/1922 | Noack | A47B 5/04 297/14 |
| 1,698,036 A | * | 1/1929 | Trammell | A47C 9/06 297/14 |
| 3,594,037 A | | 7/1971 | Sherman | |
| 4,460,215 A | * | 7/1984 | Chamberlain | A47C 9/06 297/14 |
| 4,519,646 A | * | 5/1985 | Leitermann | B60N 2/3013 296/65.09 |
| 4,679,749 A | * | 7/1987 | Ryan | B64D 11/06 244/122 R |
| 4,902,069 A | * | 2/1990 | Lehnert | B64D 11/0691 297/14 |
| 5,429,414 A | * | 7/1995 | Olsson | B60N 2/3084 297/14 |
| 5,497,724 A | | 3/1996 | Brown et al. | |
| 6,647,916 B2 | | 11/2003 | Neese et al. | |
| 6,726,279 B1 | | 4/2004 | Figel et al. | |

(Continued)

*Primary Examiner* — Timothy J Brindley
(74) *Attorney, Agent, or Firm* — Price Heneveld LLP (57) ABSTRACT

An integrated folding seat and movable backrest includes a mounting frame for all of the elements of the assembly. A vertically movable backrest frame is slideably attached to the mounting frame and coupled to a pivot down seat frame by pivot arms. The pivot arms include a curved upper arm extending between the mounting frame and the seat frame, a lower arm extending between the mounting frame and the seat frame, and a lift arm having one end pivotally coupled to the lower arm at a position intermediate the ends of the lower arm, and an opposite end coupled to the backrest frame.

11 Claims, 14 Drawing Sheets

(56) References Cited

U.S. PATENT DOCUMENTS

| | | | |
|---|---|---|---|
| 6,945,190 B1* | 9/2005 | Frandsen | B63B 19/19 |
| | | | 114/363 |
| 7,367,616 B2* | 5/2008 | Summerford | A47C 9/06 |
| | | | 297/14 |
| 7,484,804 B2* | 2/2009 | Clauss | A47C 1/121 |
| | | | 297/14 |
| 8,113,137 B2 | 2/2012 | Thompson | |
| 9,340,293 B2* | 5/2016 | Guering | B64D 11/06 |
| 2002/0109369 A1* | 8/2002 | Boomhower | B60N 2/3047 |
| | | | 296/63 |
| 2008/0066672 A1* | 3/2008 | Eekhoff | B63B 29/04 |
| | | | 114/363 |
| 2010/0037814 A1* | 2/2010 | Sahr | B63B 29/02 |
| | | | 114/363 |
| 2014/0368012 A1* | 12/2014 | Burd | B64D 11/06 |
| | | | 297/337 |
| 2016/0214689 A1* | 7/2016 | Foss | B63B 29/04 |

* cited by examiner

INTEGRATED SEAT AND BACKREST

CROSS-REFERENCE TO RELATED APPLICATIONS

This application claims priority under 35 U.S.C. §119(e) and the benefit of U.S. Provisional Application No. 62/016,844 entitled INTEGRATED MOVABLE SEAT AND BACKREST, filed on Jun. 25, 2014, by Christopher M. Gratz, the entire disclosure of which is incorporated herein by reference.

BACKGROUND OF THE INVENTION

The present invention relates to an integrated mounting frame seat with a seat and backrest, with the seat movable from a vertical stowed position to a lowered use position while moving the seat back to a raised, back-resting position.

Many pleasure boats, such as those available in the Pursuit® and Tiara® lines of yachts, include seats in the cockpit area for increasing the available seating. Such seats are usually stowed in a vertical position parallel to the transom or sides to allow full use of the cockpit. When additional seating is desired, they fold down from the vertical stowed position to a lowered position in which they form a bench seat. Bolsters, which extend across the transom and along the port and starboard sides, typically form the backrest for the seat. The bolster height in some boats, however, is too low to form a comfortable backrest. Also, in some fold-out seat designs for boats, the bolster is pivotally mounted to hold the seat in a stowed position and must be manipulated by pivoting the bolster upwardly to allow the folding seat to be extended. Subsequently, the bolster is again returned to its normal position. This complicates the operation of the seat for the user and the bolster may be uncomfortable for use as a backrest.

SUMMARY OF THE INVENTION

An integrated seat and backrest frame assembly includes a mounting frame for attaching to a generally vertical surface, a seat frame with a seat, and a backrest frame having a backrest. Pivot arms pivotally mount the seat frame to the mounting frame. The backrest frame is slideably coupled to the mounting frame, and a lift arm is pivotally coupled to the pivot arms, which couples the seat frame to the mounting frame, such that, as the seat frame is pivoted downwardly for use of the seat, the lift arm moves upwardly to raise the backrest frame and backrest in a generally vertical direction.

By integrating a mounting frame with a sliding seat back and pivoted seat into one unit which can be mounted to a boat as a single unit either during manufacturing or as an aftermarket accessory, the present invention improves upon prior movable seats and backs, such as disclosed in U.S. Pat. No. 8,113,137. The design creates a dimensionally more stable integrated assembly which is easier to mount. Backrest support guides are slotted and bushed to reduce fabrication time and improve tolerancing. Curved pivot arms reduce obstruction in the seating area and provide better utilization of seating surfaces in multiple seat applications. The integrated frame and pivot mechanism accommodates thicker cushions to improve ergonomics and comfort for the user. It also provides an improved angle of pull for moving the seat from a stowed position to a use position, making use of the seat assembly easier.

These and other features, objects and advantages of the present invention will become apparent to those skilled in the art upon reading the following description thereof together with reference to the accompanying drawings.

DETAILED DESCRIPTION OF THE PREFERRED EMBODIMENT

Figure 1:
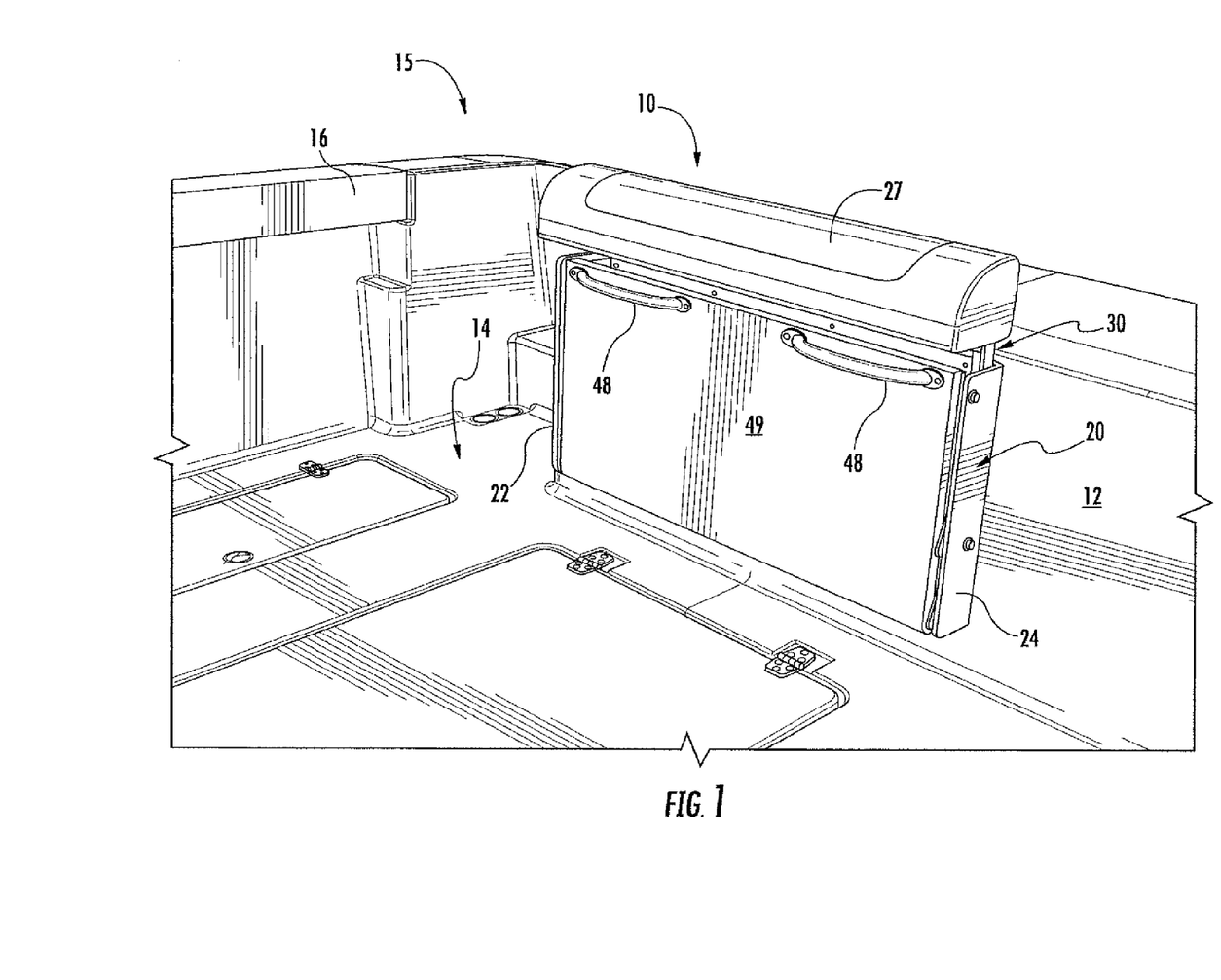
FIG. 1 is a fragmentary perspective view of a boat to which the integrated mounting frame and movable seat and backrest frames of this invention is mounted and shown with the seat in a stowed position.
Figure 2:
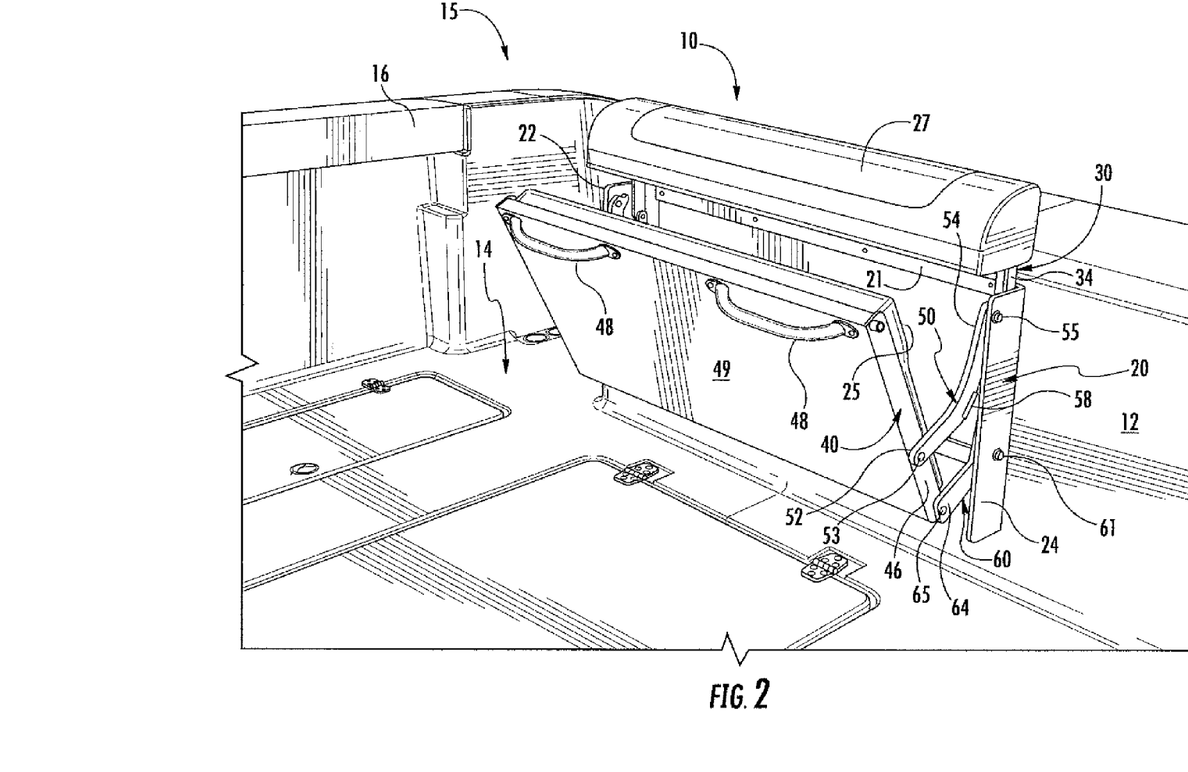
FIG. 2 is a fragmentary perspective view of the boat and assembly of FIG. 1, shown with the seat moving toward a use position.
Figure 3:
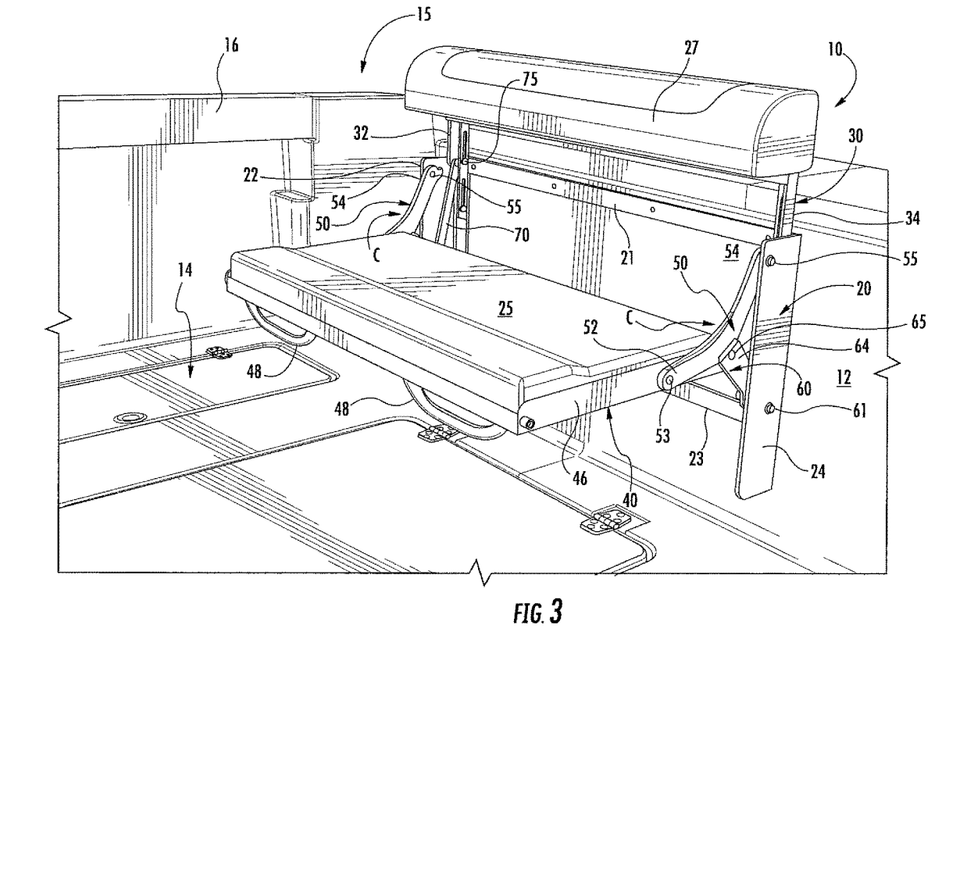
FIG. 3 is a fragmentary perspective view of the boat to which the integrated mounting frame, seat and backrest frames are mounted and shown with the seat in a lowered use position and the backrest raised.

Referring initially to FIG. 1-3, there is illustrated the stern area of a boat 15 with a seat frame assembly 10 mounted to the aft bulkhead 12 of the boat's cockpit 14. The assembly 10 includes a mounting frame 20, a padded seat 25 coupled to pivot down seat frame 40, and a padded backrest 27 coupled to a vertically sliding backrest frame 30. The assembly 10 is best seen in FIGS. 4-8 and is an integrated combination of the mounting frame 20, the slideable backrest frame 30, and the pivoting seat frame 40. The entire assembly 10 can be secured to a bulkhead 12 of a boat, such as in the cockpit 14 area by attaching the mounting frame to the bulkhead. Although as shown in FIGS. 1-3 assembly 10 is mounted on the aft bulkhead 12, the assembly 10 can be mounted to side bulkheads and, if the boat's cockpit is sufficiently large, two or more seat assemblies 10 may be mounted therein. The fact that the assembly 10 is an independent integrated assembly allows its installation in a variety of available locations either by the manufacturer or as an aftermarket accessory installed by a dealer.

The boat 15 typically will have bolsters 16 (FIGS. 1-3) along the inside top edges of the bulkheads defining the cockpit. When the seat 25 is stowed as shown in FIG. 1, the backrest 27 is lowered preferably to vertically align with the existing fixed bolsters. As the seat is lowered as seen in FIGS. 2 and 3, the backrest 27 is raised to a comfortable back-supporting position.

Mounting frame 20, as best seen in FIGS. 4-8, includes a first vertically extending L-shaped member 22, a horizontally spaced-apart second L-shaped vertically extending member 24, and vertically spaced horizontally extending cross support members 21 and 23 secured to the L-shaped members 22 and 24. All components of the frame members for the seat assembly are made of stainless steel. Since the mounting frame 20 is visible, as is the trim panel 49 (FIGS. 1, 2, and 7) for the bottom of the seat frame 40, they are powder coated in a color to match that of the area of the boat to which the seat assembly is mounted.

Figure 9:
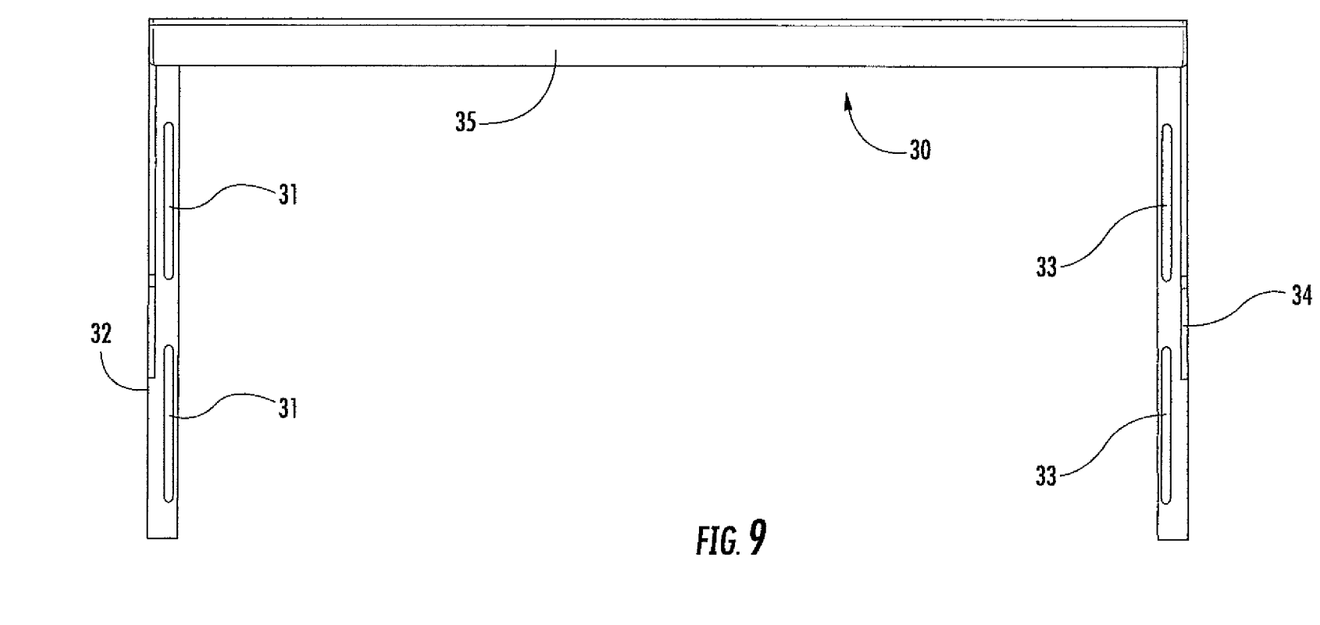
FIG. 9 is a front elevational view of the backrest frame.
Figure 10:
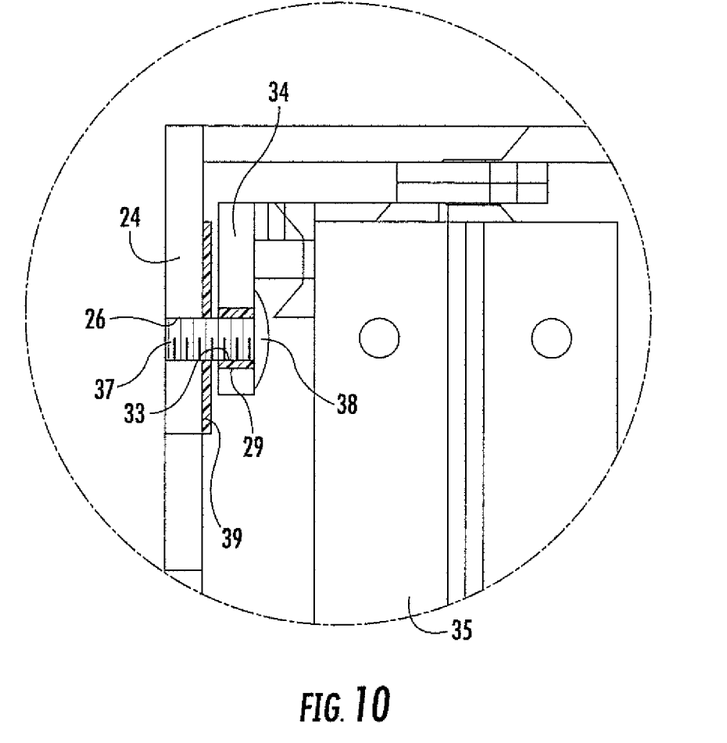
FIG. 10 is an enlarged detailed top view of the circled area X of FIG. 5.
Figure 11:
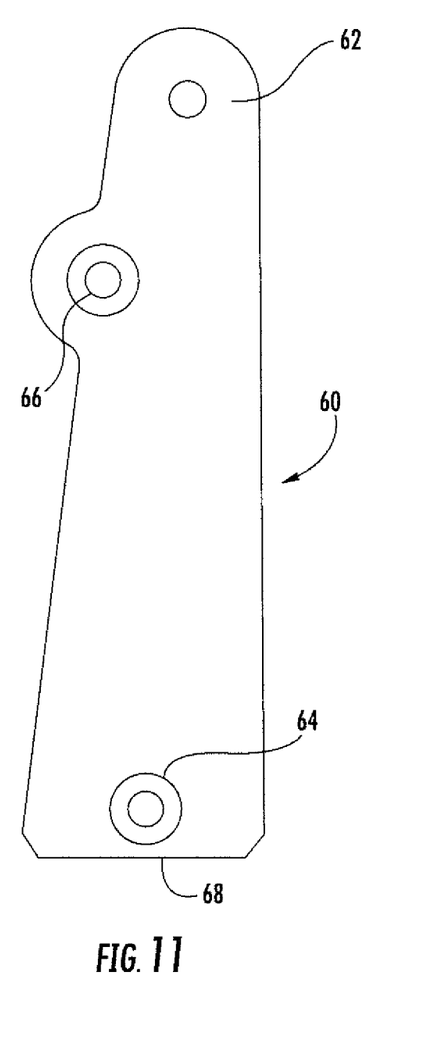
FIG. 11 is an enlarged side elevational view of one of the lower pivot arms of the seat frame assembly.
Figures 12, 13:
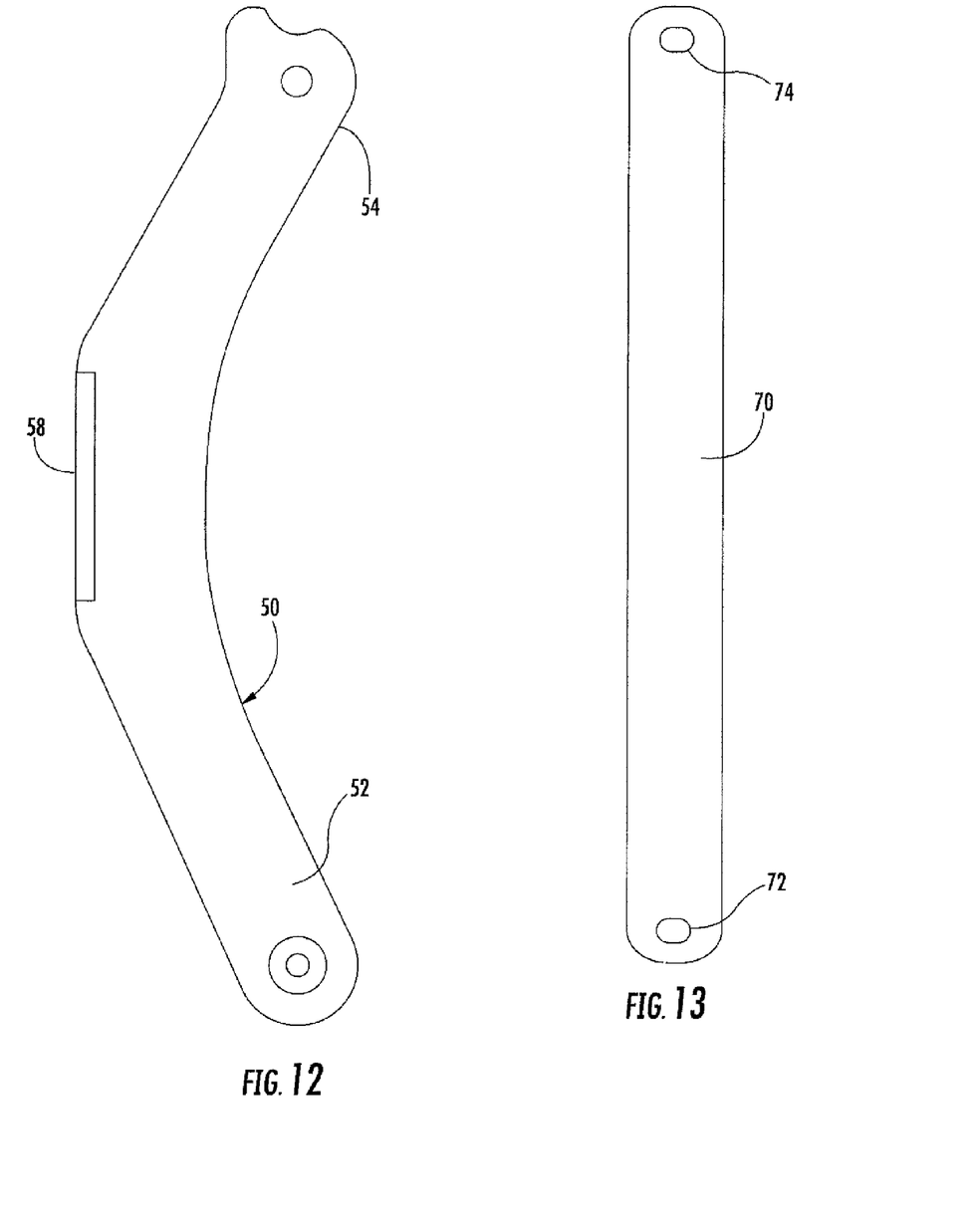
FIG. 12 is an enlarged side elevational view of one of the curved upper pivot arms of the seat frame assembly.
FIG. 13 is an enlarged side elevational view of one of the backrest lift arms.
Figure 14:
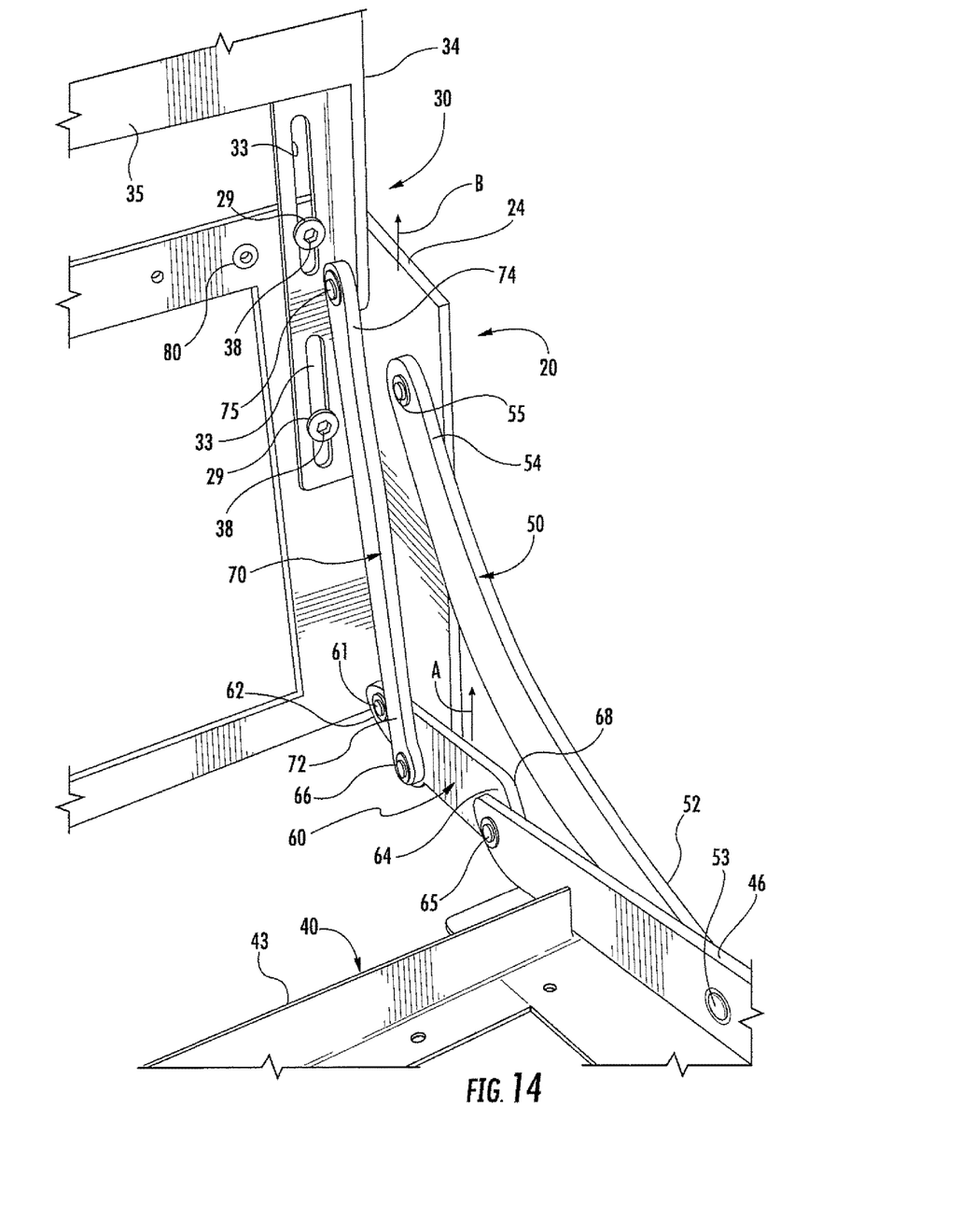
FIG. 14 is a fragmentary perspective view of the pivot arms in their position as the seat frame is being lowered.

Slideably mounted between members 22 and 24 is the backrest frame 30, which is seen in detail in FIGS. 9 and 10. The backrest frame includes vertically extending L-shaped members 32 and 34 with vertically spaced-apart elongated slots 31 and 33, respectively, in the rear facing section of the members 32 and 34. An angled cross member 35 couples the upper ends of members 32 and 34, as seen in FIG. 9. As illustrated in FIGS. 1-3, the backrest frame 30 and attached backrest 27 are slideably mounted to the mounting frame 20. Threaded fasteners 37 extend through lubricious polymeric bushings 29 in each of the slots 31, 33 and into threaded apertures 26 in L-shaped member 24 (FIG. 10). FIG. 10 also illustrates the bushings employed for the pivot coupling of the pivot arms to the frame members 30 and 40. All of the bushings can be conventional single or split bushings to provide a lubricious sliding or rotational interface between the various movable members. Fasteners 37 have an enlarged head 38, as seen in FIG. 10, for holding frame members 32, 34 in sliding engagement to the corresponding mounting frame members 22 and 24. A lubricious polymeric washer 39 is positioned between members 22, 32 and 24, 34 to facilitate the sliding motion. The same lubricious sliding interface mounting of frame 30 to frame 20 is provided for each of the four slots 31, 33. The length of slots 31, 33 is selected to limit the travel of the backrest frame 30 and backrest 27. Typically, the range of motion is from about 3 inches to about 4 inches depending on the boat installation. On one boat, the range of motion of the backrest was 3.5 inches.

Figure 7:
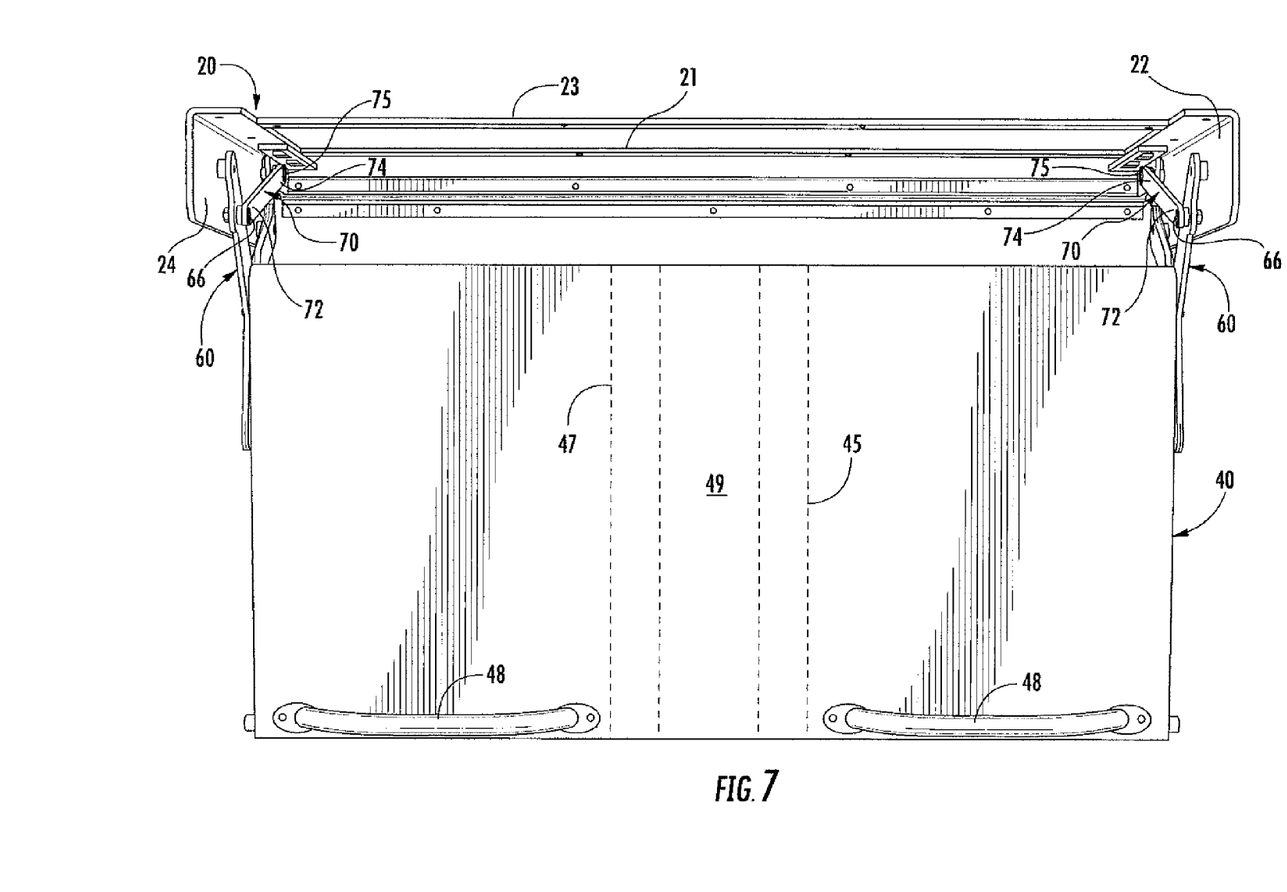
FIG. 7 is a bottom perspective view of the assembly shown in FIG. 5.
Figure 8:
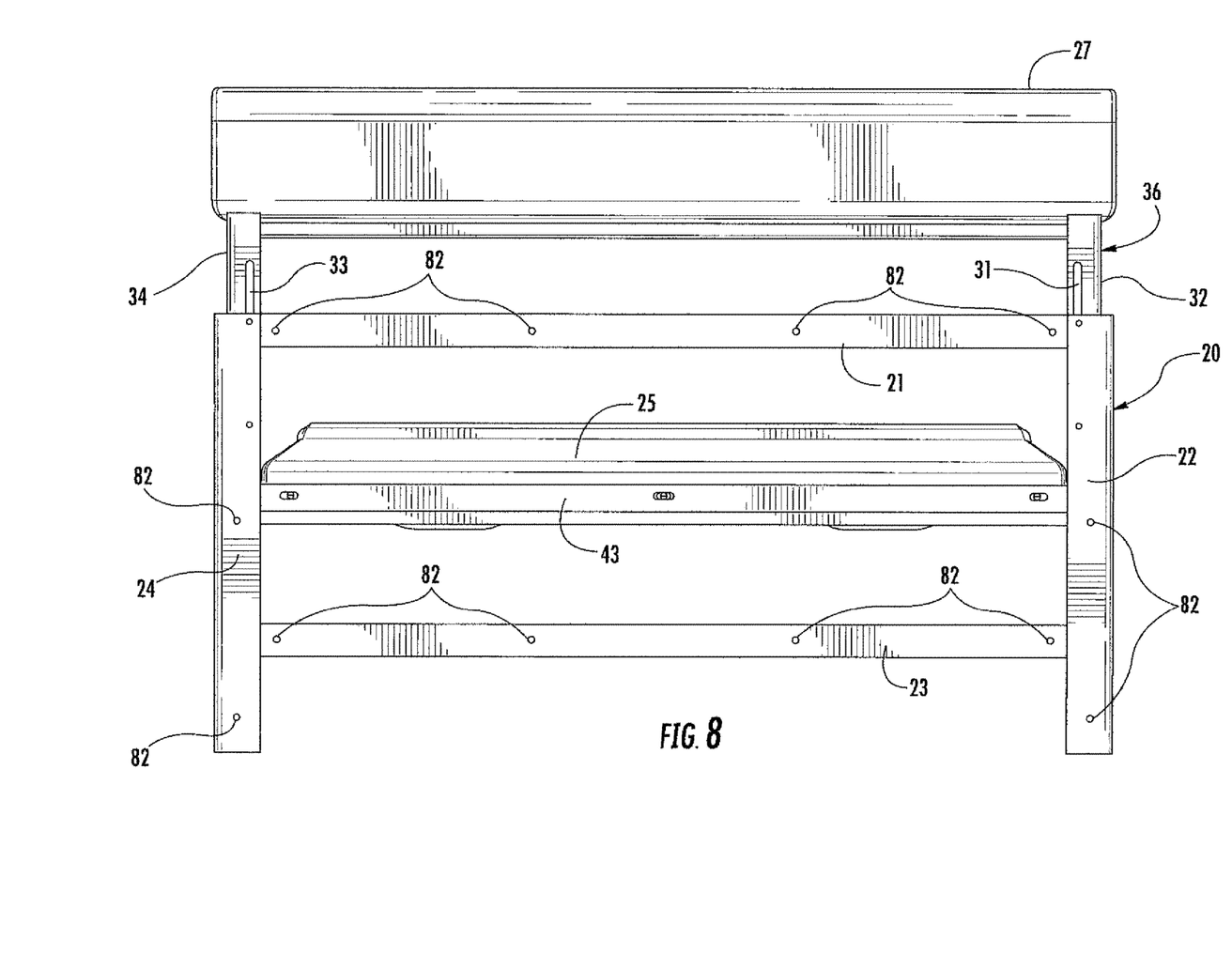
FIG. 8 is a rear perspective view of the assembly shown in FIG. 5.

The integrated frame assembly 10 also includes a rectangular seat frame 40 (FIGS. 2-8) including L-shaped outer edges 44 and 46 with front and rear cross members 41 and 43 and intermediate support members 45 and 47 (shown in phantom in FIG. 7). The bottom of the seat frame 40 is covered by a trim panel 49 to which a pair of handles 48 (FIGS. 1-5 and 7) is mounted for lowering the seat frame 40 from the stowed position shown in FIG. 1 to a use position shown in FIG. 3. The outer edges 44 and 46 of the seat frame fit within the L-shaped members 22 and 24 of the mounting frame 20 when stowed, as seen in FIG. 1.

Figure 4:
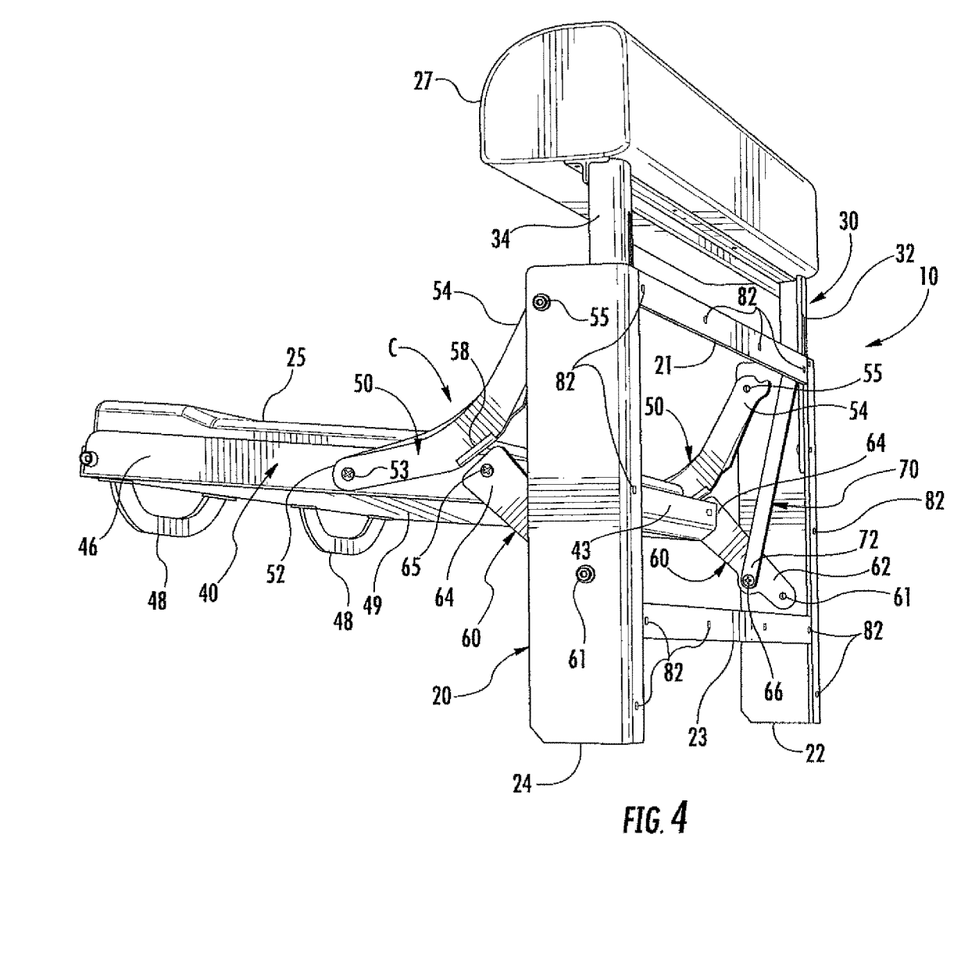
FIG. 4 is a rear angled perspective view of the integrated mounting frame and pivot links movably coupling the seat frame and the backrest frame to the mounting frame.

The seat frame 40 is pivotally mounted to the mounting frame 20 by upper and lower pivot arms 50 and 60, respectively, at the opposite sides of frame 40 (FIGS. 3-4). Upper pivot arms 50 are curved through an angle of about 50°. This provides an open area (arrows C in FIGS. 3 and 4) near the center of upper pivot arms 50 keeping them from interfering with the sides of the seating area of seat frame 40. Pivot arms 50 have one end 52 (FIGS. 2-4, 14, and 15) coupled to edge members 44 and 46 by pivot pins 53. The opposite ends 54 of pivot arms 50 are pivotally coupled to the vertical members 22, 24 of mounting frame 20 by pivot connections or pins 55. The lower pivot arms 60 are pivotally coupled to L-shaped members 22, 24 at one end 62 by pivot pins 61 and at their opposite ends 64 (FIGS. 2-4, 14 and 15) to the rear of outer edge members 44 and 46 of seat frame 40 at pivot connections 65.

Figure 5:
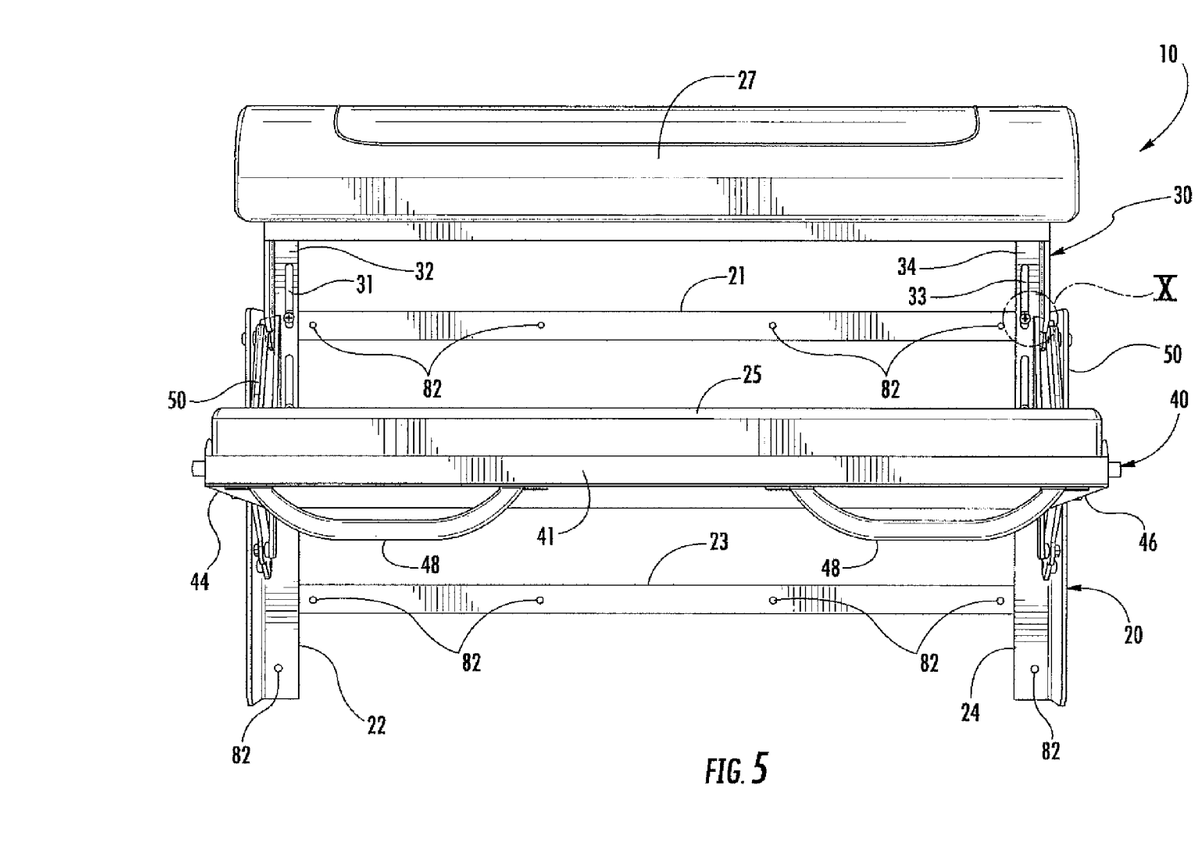
FIG. 5 is a front perspective view of the assembly shown in FIG. 3.
Figure 6:
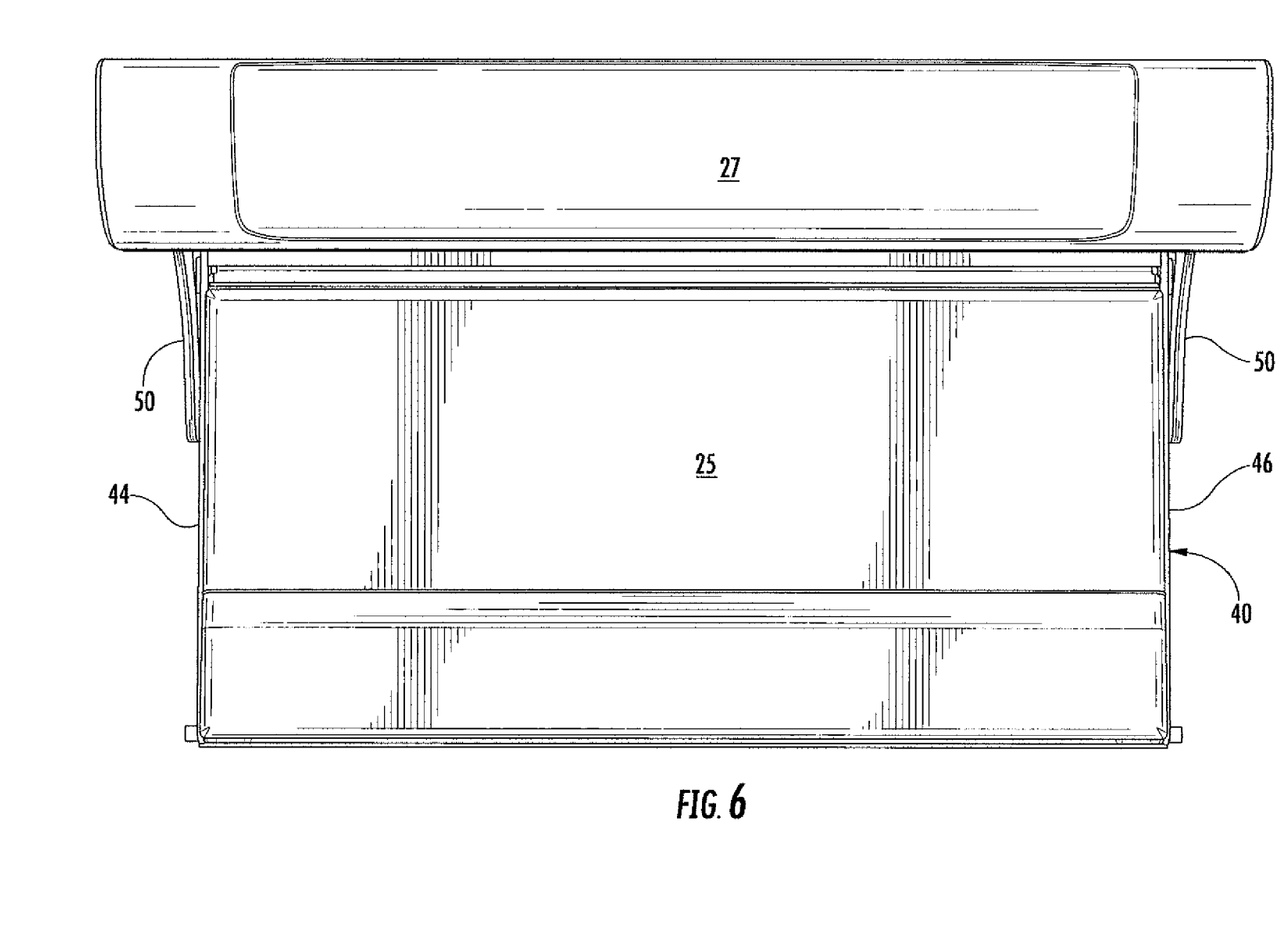
FIG. 6 is an enlarged top perspective view of the assembly shown in FIG. 5.
Figure 15:
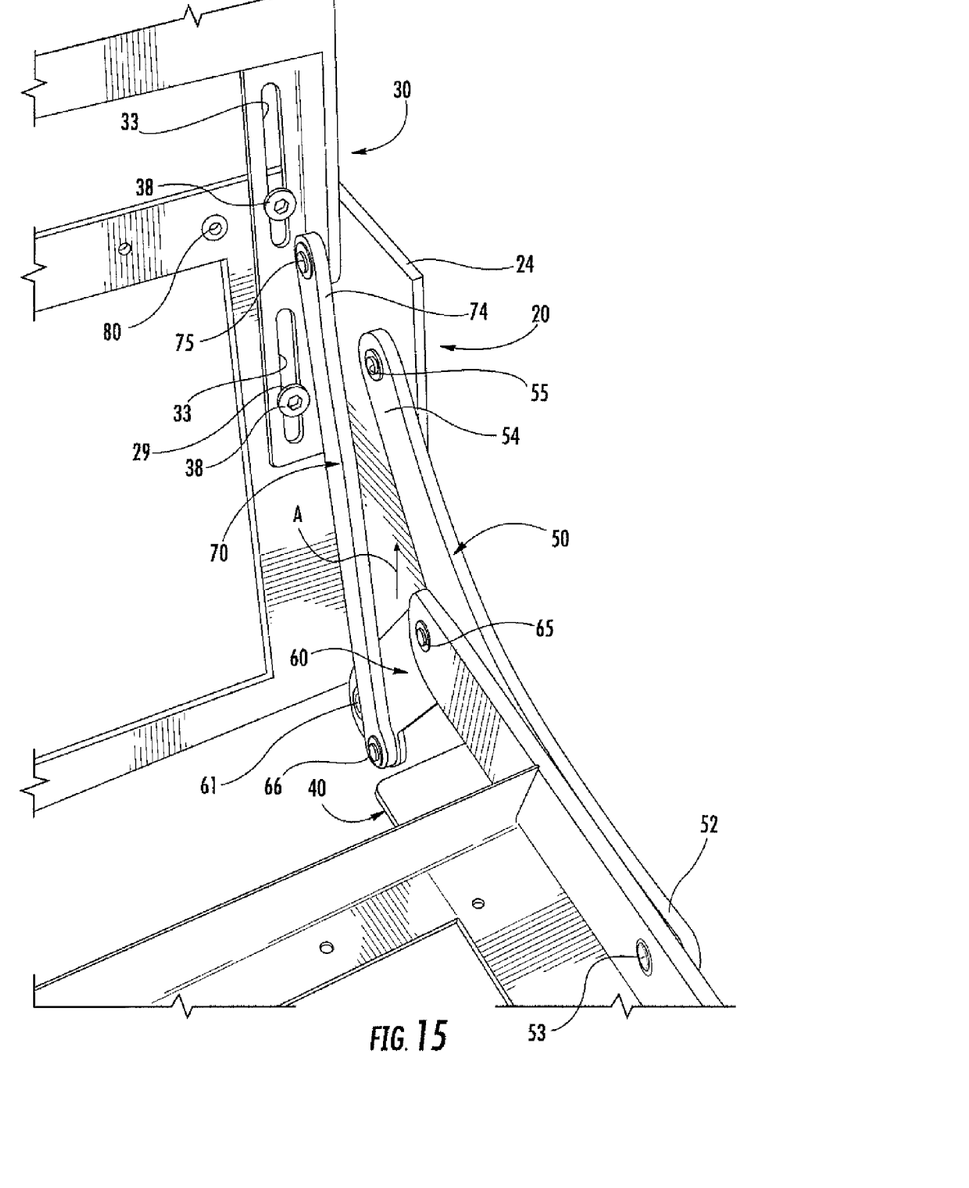
FIG. 15 is a fragmentary perspective view of the pivot arms when the seat frame is fully lowered.

Lift arms 70 (FIGS. 3, 4, 7, 14, and 15) have one end 72 pivotally coupled to lower arms 60 at pivot connections 66 (FIGS. 4, 14, and 15) intermediate the ends 62 and 64 of lower pivot arms. The lift arms 70 have opposite ends 74, which are pivotally coupled at pivot connections 75 (FIGS. 3, 7, 14, and 15) to the members 32, 34 of backrest frame 30. As the seat frame 40 is moved from a stowed position (as shown in FIG. 1) to a deployed position (as shown in FIGS. 2, 3, and 15), each of the pair of lift arms 70 having upper ends 74 pivotally coupled to members 32 and 34 of the backrest frame 30 raises as the lower pivot arms 60 rotate on the axis of pivot point 61 upwardly as seen by arrow A in FIGS. 14 and 15. This raises lift arms 70 in the direction of arrow B (FIG. 14) as the seat frame 40 pushes against pivot 65 of arms 60 when the seat is moved to a lowered use position. When the seat is again retracted to the stowed position of FIG. 1, the opposite rotation of pivot arms 50 and 60 occurs. Arms 70 lower the backrest frame 30 in a direction opposite arrow B to a compact lowered position, as shown in FIG. 1, as the seat frame 40 is rotated to the stowed position. Thus, as the pivot arms 50 and 60 rotate between the seat deployed and seat stowed positions, arms 70 raise and lower the backrest frame 30 and the backrest 27 attached thereto. When the seat is in a fully lowered position as seen in FIGS. 3-5, the end 68 of pivot arm 60 seats against a stop tab 58 of arm 50 to hold the seat frame 40 and seat 25 in a secure seating position.

The integrated seat frame assembly 10 forms a complete seat assembly when seat and back padding 25 and 27 is mounted to the seat frame 40 and backrest frame 30 in a conventional manner. The integrated structure can then be secured to a bulkhead, such as 12, of a boat (FIGS. 14 and 15) using spaced-apart conventional threaded fasteners 80 extending through apertures 82 in mounting frame 20 (see FIGS. 4, 5, and 8) and into the bulkhead. Mounting frame 20 contains all of the structural elements of the integrated seat assembly 10 and can be conventionally secured to any generally vertical surface on a boat with the preassembled bushings, glides, and slide mechanism.

It will become apparent to those skilled in the art that various modifications to the preferred embodiment of the invention as described herein can be made without departing from the spirit or scope of the invention as defined by the appended claims.

The invention claimed is:

1. A method of installing a preassembled frame and integrated seat and backrest assembly on a boat comprising:
   assembling the preassembled frame and integrated seat and backrest assembly having:
   a rectangular mounting frame for attaching to a generally vertical surface of a boat;
   a seat frame;
   a backrest frame;
   upper and lower pivot arms pivotally mounting said seat frame to said mounting frame;
   a backrest frame slideably coupled to said mounting frame;
   a lift arm pivotally coupled to said lower pivot arms and to said backrest frame, said lower pivot arms coupling said seat frame to said mounting frame and to said backrest frame, such that, as said seat frame is pivoted downwardly, said lift arm moves upwardly to raise said backrest frame in a generally vertical direction; and attaching said mounting frame to the boat.

2. The method as defined in claim 1 wherein said upper pivot arms have one end pivotally coupled to said mounting frame and an opposite end pivotally coupled to said seat frame.

3. The method as defined in claim 2 wherein said upper pivot arms are curved.

4. The method as defined in claim 3 wherein said lower pivot arms have one end pivotally coupled to said mounting frame and an opposite end pivotally coupled to said seat frame.

5. The method as defined in claim 4 wherein said lift arm is pivotally coupled to said lower pivot arm at a location intermediate to the ends of said lower pivot arm.

6. A preassembled frame and integrated seat and backrest assembly comprising:
   a mounting frame for attaching to a generally vertical surface of a boat;
   a seat frame;
   upper and lower pivot arms pivotally mounting said seat frame to said mounting frame, wherein said upper pivot arms are curved and have one end pivotally coupled to said mounting frame and an opposite end pivotally coupled to said seat frame and wherein said upper pivot arm includes a stop between said one end and said opposite end;
   a backrest frame slideably coupled to said mounting frame, wherein said lower pivot arms have one end pivotally coupled to said mounting frame and an opposite end pivotally coupled to said seat frame; and
   a lift arm pivotally coupled to said lower pivot arms at a location intermediate to the ends of said lower pivot arms and to said backrest frame, said lower pivot arms coupling said seat frame to said mounting frame and to said backrest frame, such that, as said seat frame is pivoted downwardly, said lift arm moves upwardly to raise said backrest frame in a generally vertical direction.

7. The assembly as defined by claim 6 wherein said stop engages said lower pivot arm at its pivot connection to said seat frame.

8. A preassembled frame and integrated seat and backrest assembly comprising:
   a mounting frame for attaching to a generally vertical surface of a boat;
   a rectilinear seat frame;
   pairs of upper and lower pivot arms pivotally mounting said seat frame to said mounting frame, wherein said upper and lower pivot arms each have one end pivotally coupled to said mounting frame and an opposite end pivotally coupled to said seat frame, and wherein said upper pivot arms are curved and, each include a stop between said one end and said opposite end;
   a rectilinear backrest frame slideably coupled to said mounting frame for vertical movement; and
   a pair of lift arms with one of said lift arms pivotally coupled at one end to a corresponding one of said lower pivot arms at a location intermediate to the ends of said lower pivot arms and at opposite ends to opposite sides of said backrest frame, such that, as said seat frame is pivoted downwardly, said lift arms move upwardly to raise said backrest frame in a generally vertical direction.

9. The assembly as defined in claim 8 wherein said stop engages said lower pivot arm at its pivot connection to said seat frame.

10. The assembly as defined in claim 9 wherein said backrest frame includes pairs of elongated vertical slots and fasteners extending through said slots to allow vertical movement of said backrest frame with respect to said mounting frame.

11. The assembly as defined in claim 10 and further including bushings extending through said vertical slots and threaded fasteners for attaching said backrest frame to said mounting frame.

\* \* \* \* \*